United States Patent
Ashwood-Smith

(10) Patent No.: US 10,133,890 B2
(45) Date of Patent: Nov. 20, 2018

(54) STRESS SENSITIVE RADIO FREQUENCY IDENTIFICATION TAG

(71) Applicant: Peter Ashwood-Smith, Gatineau (CA)

(72) Inventor: Peter Ashwood-Smith, Gatineau (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/249,934

(22) Filed: Aug. 29, 2016

(65) Prior Publication Data
US 2018/0060615 A1 Mar. 1, 2018

(51) Int. Cl.
H04Q 5/22 (2006.01)
G06K 7/10 (2006.01)

(52) U.S. Cl.
CPC .................. G06K 7/10198 (2013.01)

(58) Field of Classification Search
CPC .................................................. G06K 7/10198
USPC .... 340/10.5, 10.1, 572.3, 545.6, 539.1, 663, 340/572.1, 691.5, 572.7; 343/702, 788, 343/867
See application file for complete search history.

(56) References Cited

U.S. PATENT DOCUMENTS

| | | | |
|---|---|---|---|
| 2005/0223812 A1 | 10/2005 | Denis | |
| 2007/0290856 A1* | 12/2007 | Martin | G06K 19/0726 340/572.3 |
| 2015/0173602 A1* | 6/2015 | Barrows | A61B 3/101 600/345 |
| 2015/0254961 A1* | 9/2015 | Brandl | G06K 19/07372 340/663 |
| 2015/0294295 A1* | 10/2015 | Colby | G06Q 20/4012 705/72 |

FOREIGN PATENT DOCUMENTS

| | | |
|---|---|---|
| CN | 203143238 U | 8/2013 |
| CN | 105139045 A | 12/2015 |
| EP | 2128587 A1 | 12/2009 |

OTHER PUBLICATIONS

International Search Report dated Sep. 7, 2017 for corresponding International Application No. PCT/CN2017/095471 filed Aug. 1, 2017.

* cited by examiner

*Primary Examiner* — Dhaval Patel

(57) ABSTRACT

There is provided a Radio Frequency Identification tag that is sensitive to stress induced in a component to which the tag is coupled. In some embodiments, the RFID tag includes an electrically conductive loop that it configured to retain the RFID tag in a first operational state and upon breakage of the electrically conductive loop the RFID tag changes into a second operational state. By adhering the stress sensitive RFID tag to a particular component or location thereon, the operation state change of the RFID tag can be indicative of a the particular component reaching a known physical change. Moreover, a change in the operational state of the RFID tag can be detected by an appropriate RFID detector or scanner without the need for visual inspection, and thus provides evaluation of components that are positioned in hard to reach locations or hidden behind one or more coverings.

7 Claims, 6 Drawing Sheets

STRESS SENSITIVE RADIO FREQUENCY IDENTIFICATION TAG

FIELD OF THE INVENTION

The present invention pertains to the field of electronic circuits and in particular to a stress sensitive Radio Frequency Identification (RFID) tag.

BACKGROUND

There are a plurality of ways to evaluate changes or loading conditions of physical components and parts. The evaluation techniques can include both measurement and visual evaluation of the components. For example, physical measurement can be used to evaluate elongation or cracking of components among other device state changes. In addition, visual inspection can be used for the detection of cracks and fractures or other state changes. Furthermore, devices or materials interconnected to a component can be used for the visual detection of changes in the experienced stress or state change of that component or components.

For fasteners or coupled components, physically marking of the fastener or coupled components in the desired orientation can be used to visually identify changes. For example a stripe of paint across a bolt and nut can visually allow one to evaluate if relative movement has occurred. As another example, for a bolt pattern associated with a wheel of a vehicle, non-symmetric markers positioned in a known orientation relative to a nut upon achieving a desired a torque, can also provide a visual indicator of nut movement or bolt elongation.

However, each of these techniques require that one is able to visually inspect the marked location under evaluation, and as such can be a time consuming task when covers or other components impede this visual inspection.

Therefore there is a need for a stress sensitive device that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide stress sensitive RFID tag. In accordance with an aspect of the present invention, there is provided a device for detecting a change in state of a physical component. The device includes a radio frequency identification (RFID) tag having a first contact and a second contact and an elongated conductive loop electrically connecting the first contact and the second contact thereby causing the RFID tag to have a first operational characteristic. In addition, the RFID tag changes from having the first operational characteristic to having a second operational characteristic upon breakage of the elongated conductive loop.

In accordance with an aspect of the present invention, there is provided a method for changing operation of a RFID tag. The method includes electrically connecting a first contact and a second contact of the RFID tag using an elongated conductive loop, thereby causing the RFID tag to operate having a first operational characteristic. In addition, upon electrical separation of the first contact and the second contact, the RFID tag changes from having a first operational characteristic to having a second operational characteristic.

According to embodiments, the first operational characteristic is an unresponsive state and the second operational state is a responsive characteristic. According to other embodiments, the first operational characteristic is a responsive state and the second operational characteristic is an unresponsive state.

According to embodiments, wherein electrically connecting the first contact and the second contact is configured to short out an antenna associated with the RFID tag, short out a portion of an antenna associated with the RFID tag or short out a power signal thereby inhibiting power supplied to a chip of the RFID tag.

According to embodiments, electrically connecting the first contact and the second contact is configured to cause a change in an operating frequency of the RFID tag. According to embodiments, the elongated conductive loop is configured such that breakage of the elongated conductive loop is permanent or irreversible.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
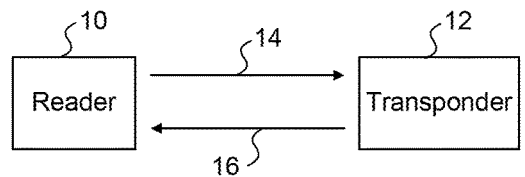
FIG. 1 illustrates a RFID system including a reader and a transponder.

It has been realized that detecting changes in the physical state of a component without the need for visual inspection is desired. In this regard, the instant application is directed to a Radio Frequency Identification tag that is sensitive to stress induced in a component to which the tag is coupled. In some embodiments, the RFID tag includes an electrically conductive loop that it configured to retain the RFID tag in a first operational state and upon breakage of the electrically conductive loop the RFID tag changes into a second operational state. By adhering the stress sensitive RFID tag to a particular component or location thereon, the operation state change of the RFID tag can be indicative of a the particular component reaching a known physical change. Moreover, a change in the operational state of the RFID tag can be detected by an appropriate RFID detector or scanner without the need for visual inspection, and thus provides evaluation of components that are positioned in hard to reach locations or hidden behind one or more coverings.

The present invention provides stress sensitive Radio Frequency Identification (RFID) tag. There is provided a device for detecting a change in state of a physical component. The device includes a radio frequency identification (RFID) tag having a first contact and a second contact and an elongated conductive loop electrically connecting the first contact and the second contact thereby causing the RFID tag in have a first operational characteristic. Upon breakage of the elongated conductive loop, the electrical connection between the first contact and the second contact is severed resulting in the RFID tag changing from having the first operational characteristic to having a second operational characteristic. According to embodiments, the elongated conductive loop is adhered to a physical component and therefore physical changes in the physical component are also realized by the elongated conductive loop. As such, detection of the change in the operational characteristic of the RFID tag can be indicative of a physical change in the physical component that can cause breakage of the elongated conductive loop.

According to embodiments, device for detecting a change in state of a physical component is configured to be unidirectional in operation. For example, the elongated conductive loop is configured such that breakage thereof is permanent or irreversible. As such, upon breakage of the elongated conductive loop, the electrical connectivity between the first contact and the second contact of the RFID tag is permanently broken. Accordingly, upon the RFID tag changing from having a first operational characteristic to having a second operational characteristic, the RFID tag will continue to have a second operational characteristic. As such, during subsequent interrogation of the RFID tag at a time in the future, for example hours, weeks, days or longer, provided that the RFID tag is still operational, the RFID tag will have a second operational characteristic.

A RFID tag or transponder is a small passive device that includes an antenna to capture energy from an interrogation signal, for example from a RFID reader, and uses captured energy from this interrogation signal to provide power to circuitry on the RFID tag resulting in the transmission of a signal from the transponder to the reader. This signal can be indicative of the presence of the tag, identification of the tag or other data for example. FIG. 1 illustrates an example of a RFID system, wherein the reader 10 emits a signal 14 which is captured by an antenna of the transponder 12. This captured signal induces energy creation in the transponder which provides energy to operate circuitry on the transponder. The transponder 12 subsequently emits a signal 16 to the reader, wherein this signal is indicative of the presence and/or identification of the transponder.

As noted above, a RFID system includes at least a RFID transponder or tag and a RFID reader device. RFID systems typically fall into two main categories which are near-field systems and far-field systems. Near-field systems employ inductive or magnetic coupling of the RFID tag to the energy emitted by the reader to provide both power for operation of the tag circuitry and for transmission from the tag to the reader. Near-field systems typically operate in the low frequency or high frequency bands. For far-field systems the reader and the tag are coupled by the electromagnetic wave in free space to which both the reader and tag are tuned. For far-field systems, energizing of the tag is based on forward power transfer transmitted by the reader and transmission from the tag and the reader is based on backscattering or reflected power. Far-field systems typically operate in the ultra high frequency and microwave ranges. It is understood that operation as a far-field system or a near-field system is at least dependent on the proximity between the reader and the tag or transponder.

Figure 2:
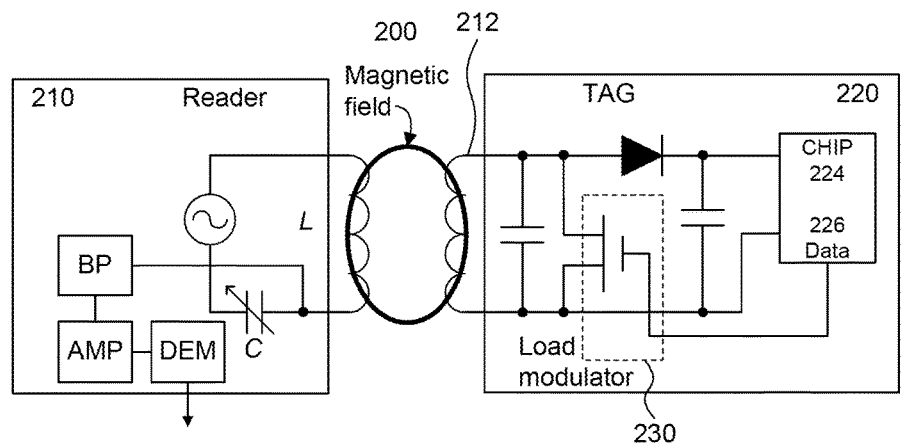
FIG. 2 illustrates a RFID system which can operate in a near-field configuration.

For RFID systems that make use of near-field communication, the reader creates a magnetic field between the reader and the tag which induces an electric current in the tag's antenna. This induced electric current is used to power circuitry on the tag enabling the tag to transmit a modulated signal to the reader which can be indicative of the tag ID. An example of a near-field RFID system is illustrated in FIG. 2, which illustrates the magnetic field 200 created by the reader 210 inductively coupling the antenna 212 of the tag 220 which can provide power for the operation of the chip 224. In this configuration, the antenna of the tag is typically configured as a coil antenna. The chip includes data 226 stored in memory thereon which is indicative of the tag ID. This data can be used by the chip to control the load modulator 230 which is interconnected with the antenna. In this manner the tag is able to transmit the tag ID to the reader. Other configurations of similar RFID transponders operating in near-field communication would be readily understood by a worker skilled in the art.

Figure 3:
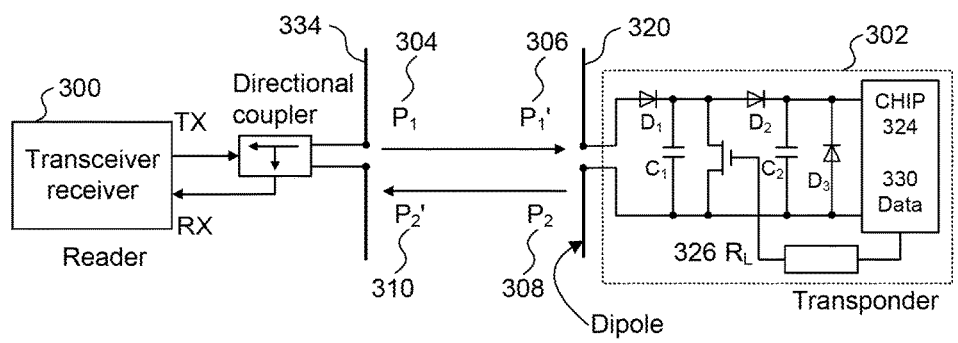
FIG. 3 illustrates a RFID system which can operate in a far-field configuration.

FIG. 3 illustrates and RFID system that makes use of far-field communication. The reader 300 emits from its antenna power $P_1$ 304 and a small portion $P_1'$ 306 thereof reaches the antenna 320 of the transponder. In this configuration, the antenna of the tag or transponder can be configured as a form of dipole antenna. A portion of the power $P_1'$ can provide energy to the chip 324 and another portion of the incoming power $P_1'$ is reflected by the antenna 306 of the transponder 302 as $P_2$ 308 and a portion of this power $P_2'$ 310 is received by the antenna 334 of the reader 300. The reflection characteristics of the transponder's antenna can be influenced by the load connected to that antenna. In order to transmit data 330 from the transponder to the reader, a load resistor connected in parallel with the antenna 320 can be switched on an off, or modulated, with respect to the data stream to be transmitted. This action can be controlled by the chip of the transponder, which can have stored in memory thereon the data for transmission. This modulated signal may then be demodulated at the reader in order to identify the information transmitted by the tag or transponder. Other configurations of similar RFID transponders operating in far-field communication would be readily understood by a worker skilled in the art.

Figure 4:
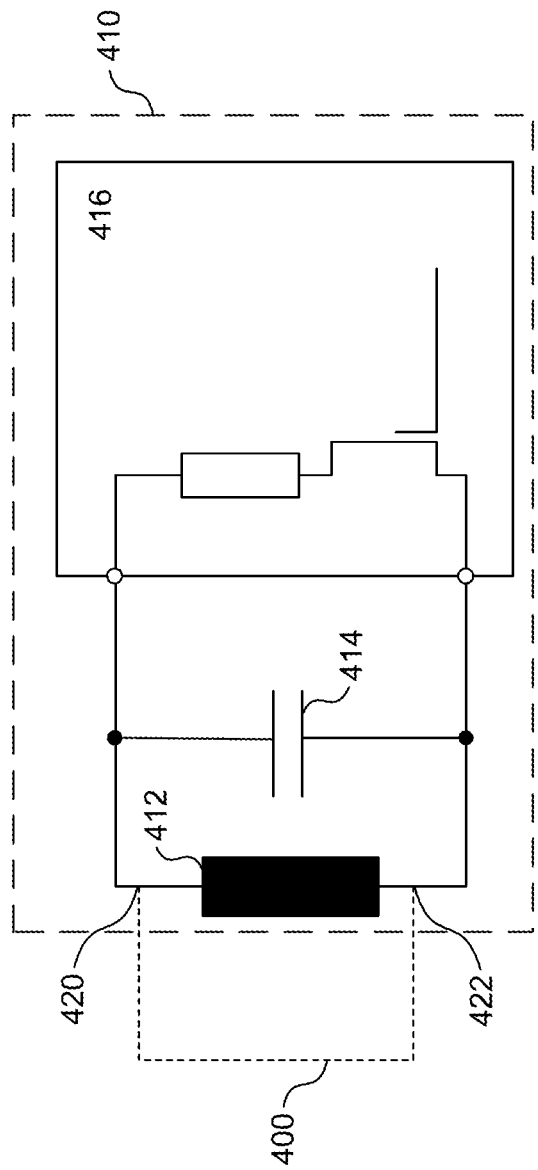
FIG. 4 illustrates a transponder or tag that is configured to be sensitive to stress in accordance with embodiments of the present invention.

FIG. 4 illustrates a stress sensitive radio frequency identification tag or transponder in accordance with embodiments of the present invention. In this embodiment, the device includes a radio frequency identification (RFID) tag 410 which has an antenna 412, a capacitor and an integrated circuit 416. In addition, the device includes an elongated conductive loop 400 that electrically connects a first contact 420 and a second contact 422 of the RFID tag. In this embodiment, upon electrical connection of this elongated loop with the first and second contacts, the operation of the RFID tag would be essentially disabled and as such the RFID tag would not be responsive to an interrogation signal transmitted by a RFID reader. Upon the breakage of the elongated conductive loop, the RFID tag would become operational. In this embodiment, as would be readily understood, relative positioning of the elongated conductive loop and the RFID tag on a component to be monitored would be determined such that breakage of the elongated conductive loop would occur in advance of any damage to the other components of the RFID tag.

In other embodiments, the elongated conductive loop is formed as critical operational component of the RFID tag and thus the RFID tag would be operational while the elongated conductive loop interconnects the first contact and the second contact. In this embodiment, upon the breakage of the elongated conductive loop, the RFID tag would become inoperable. In some circumstances, it may be suitable for the RFID tag to remain operational until breakage of the elongated conductive loop as upon the application of a level of stress to cause breakage of the elongated conductive loop may further cause other components of the RFID tag to be damaged and this damage to the RFID tag may also cause the RFID tag become inoperative.

Figure 5:
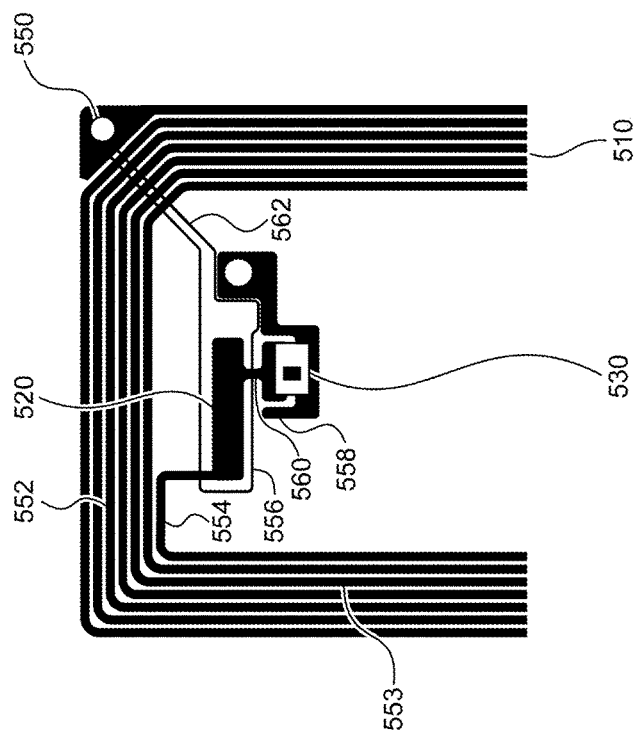
FIG. 5 illustrates a portion of a RFID tag showing locations for electrical connection of the elongated conductive loop, in accordance with embodiments of the present invention.

FIG. 5 illustrates a portion of a RFID tag showing locations for electrical connection of the elongated conductive loop, in accordance with embodiments of the present invention. The tag includes a capacitor 520, a coil antenna 510 and an integrated circuit 530. The capacitor 520 is formed from two parallel plates, namely an upper plate on a top layer and a lower plate on a bottom layer, wherein the top and bottom layers are separated by an insulator. Both the antenna 510 and the capacitor 520 can be precisely tuned in order to properly operate as an antenna, for example, to form a properly tuned resonance circuit.

According to embodiments, the elongated conductive loop upon electrical connection to a first contact and a second contact associated with the RFID tag, the RFID tag would be rendered inoperable. In this embodiment and with further reference to FIG. 5, shorting the capacitor 520 would cause the RFID tag to stop functioning. It is noted that for this RFID tag configuration, the elongated conductive loop has to connect to both plates of the capacitor and therefore connects to two different layers. The RFID tag will stop functioning because shorting the capacitor inhibits charge from being stored in the capacitor. This action will impact function due to either (or both): changing the antenna impedance and therefore its ability to transmit and receive radio energy; or removing the power supply used for operation of the chip. Furthermore, as the antenna and the capacitor are tuned to properly operate, shorting out either the inductor or the capacitor will inhibit the RFID tag from operating. Accordingly, disabling the RFID tag using the elongated conductive loop can be enabled by disrupting the resonant circuit, for example by shorting out part or all of the capacitor or inductor (antenna), or equivalently by shorting the power/signal input and ground terminals of the integrated circuit.

In some embodiments, instead of the elongated conductive loop producing a dead short, the elongated conductive loop can include a suitable inductor, capacitor or resistor which is configured to disrupt the resonance of the circuit, resulting in the disablement of the RFID tag.

In some embodiments, the elongated conductive loop is electrically connected to the first and second contact of the RFID tag such that only part of the antenna and/or capacitor is shorted. This configuration can cause a frequency shift, so while the RFID tag would function both before and after breakage of the elongated conductive loop, the RFID tag would be operating in a different frequency after breakage of the elongated conductive loop.

With further reference to FIG. 5, plural locations or contacts to which the elongated conductive loop can be connected are illustrated. In some embodiments, the elongated conductive loop is configured to short out the entire antenna of the tag. In this embodiment, the elongated conductive loop can electrically connect contact A 550 and contact D 554. In some embodiments, the elongated conductive loop is configured to short out a portion of the antenna. For example, the elongated conductive loop can electrically connect contact A 550 and contact B 552, or contact A 550 and contact C 553 or contact B 552 and contact C 553 or contact B 552 and contact D 554 or contact C 553 and contact D 554. In some embodiments the elongated conductive loop is configured to short out the entire tag, and this may be accomplished by the elongated conductive loop electrically connecting contact A 550 and contact E 556. In some embodiments the elongated conductive loop is configured to short out the capacitor, and this may be accomplished by the elongated conductive loop electrically connecting contact D 554 and contact E 556. In some embodiments the elongated conductive loop is configured to short out the power signal, namely impeding power to the chip, and this may be accomplished by the elongated conductive loop electrically connecting contact E 556 and contact F 558. As such, there are a plural of other configurations for the electrical connection of the elongated conductive loop to the tag illustrated in FIG. 5, in order to disable the RFID tag when the elongated conductive loop electrically connects a first contact and a second contact, and a worker skilled in the art would readily understand other configurations. Moreover a worker skilled in the art, in light of the above discussion, would readily understand how to determine a first contact and a second contact for the disabling of other RFID tag configurations, such that while the elongated conductive loop electrically connects the first and second contact the RFID tag is inoperative in the desired frequency.

In some embodiments, it is desired that the breakage of the elongated conductive loop disables the RFID tag. With further reference to FIG. 5, in some embodiments the electrical link located at G 560 or H 562 can be replaced by the elongated conductive wire. As both of these electrical links are required for operation of the RFID tag, breakage of the elongated conductive wire would result in the disablement of the RFID tag. However, in this configuration careful design of the elongated conductive loop can be required in order to ensure that the elongated conductive loop does not present too much extra impedance. However, this extra impedance issue may be resolved with suitable adjustment of the capacitor and inductor. As such, there are a variety of other configurations for the electrical connection of the elongated conductive loop to the tag illustrated in FIG. 5, in order to disable the RFID tag when the elongated conductive loop that electrically connects a first contact and a second contact breaks, and a worker skilled in the art would readily understand other configurations. Moreover a worker skilled in the art, in light of the above discussion, would readily understand how to determine a first contact and a second contact for the enabling of other RFID tag configurations, such that while the elongated conductive loop electrically connects the first and second contact the RFID tag is operative in the desired frequency and inoperative upon breakage of the elongated conductive loop.

According to embodiments, the elongated conductive loop is fabricated on or adhered to an extension of the substrate associated with the RFID tag. The RFID tag with the elongated conductive loop can subsequently be coupled to the component for which the detection of deformation is desired. In some embodiments, the portion of the substrate upon which the elongated conductive loop is adhered or formed is configured to attach to the component being monitored along the length of the portion of the substrate. In this configuration, localized excessive strain experienced by the elongated conductive loop at various points along the length of the elongated conductive loop may result in the breakage of the loop. For example, this attachment configuration of the elongated loop can be used to monitor localized excess stresses within components to which it is attached. As such, breakage of the elongated conductive loop can be indicative of the physical component reaching an unsafe condition, for example reaching or almost reaching a physical state which transitions from elastic deformation to plastic deformation.

In other embodiments, the portion of the substrate upon which the elongated conductive loop is adhered or formed is configured to attach to the component being monitored at a first location and a second location, such that the strain experienced by the elongated loop would be an average strain over the distance between the first location and the second location. For example, this attachment configuration of the elongated loop can be used to monitor the relative movement of two components, for example the rotation of a nut relative to a bolt or other configuration as would be readily understood. As such, breakage of the elongated conductive loop can be indicative of an unsafe condition.

Figure 6:
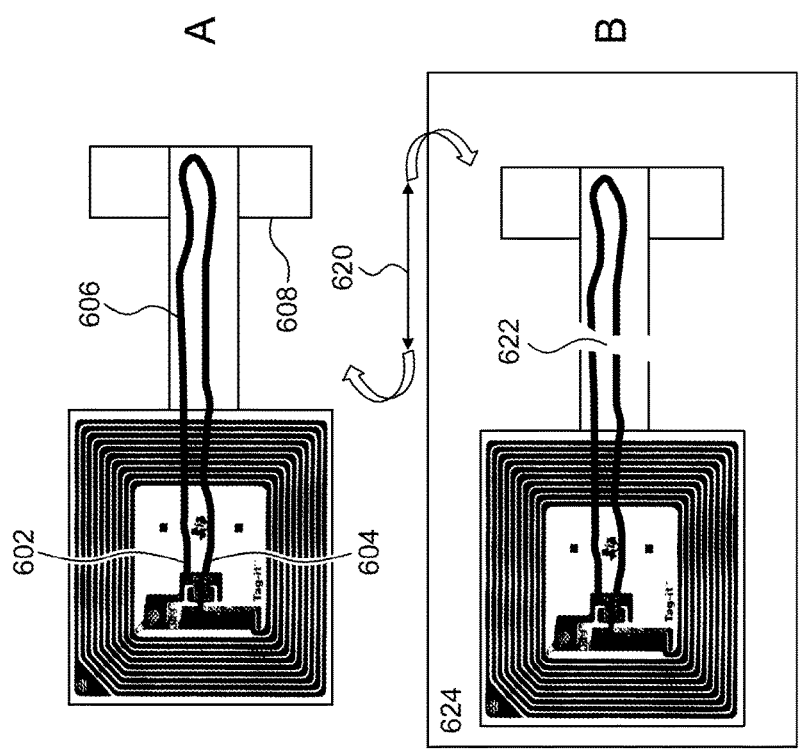
FIG. 6A illustrates a RFID tag having an extension for the elongated conductive loop, in accordance with embodiments of the present invention.
FIG. 6B illustrates the RFID tag of FIG. 6A wherein the tag has been adhered to a component, in accordance with embodiments of the present invention.

FIG. 6A illustrates a RFID tag having an extension for the elongated conductive loop, in accordance with embodiments of the present invention. The elongated conductive loop 606 is connected to the chip of the RFID tag at a first location or contact 602 and a second location or contact 604, wherein the electrical connection of these two locations disables the RFID tag. The elongated conductive loop is adhered to an extension 608 of the substrate of the RFID tag wherein this extension can be positioned on the component being monitored such that the extension will experience deformation that is to be monitored.

In FIG. 6B the RFID tag and extension for example as illustrated in FIG. 6A has been adhered to a component 624 and when this component experiences torsion, bending or other forces that cause stresses and deformation within the component, the elongated conductive loop also experiences these loading conditions due to adhesion of the extension to the component. Upon the elongated conductive reaching a deformation of a particular level, the elongated conductive loop will break 622, thereby electrically disconnecting the first location and the second location, resulting in the RFID tag shifting from a disabled state to an enabled state. Therefore after breakage of the elongated conductive loop and subsequent interrogation of the RFID tag by a suitable reader, the RFID tag will transmit the data stored thereon to the reader. Upon detection and identification of this RFID tag, the operator of the reader is thus informed of a potential problem with the component being monitored. As noted previously, due to the radio frequency communication of the RFID tag, visual identification of a potential problem is not required.

According to embodiments, the RFID tag including the elongated conductive loop can be used for the detection of relative rotation multiple components, relative elongation of multiple components and the like. For example the relative rotation between a nut and a bolt, relative rotation of a hose and hose interconnector, separation of interconnected hoses and the like. As would be readily understood, the elongated conductive loop can be configured to break at a particular range of deformation, which would be indicative of a particular range of relative rotation or range of relative elongation.

Figure 7:
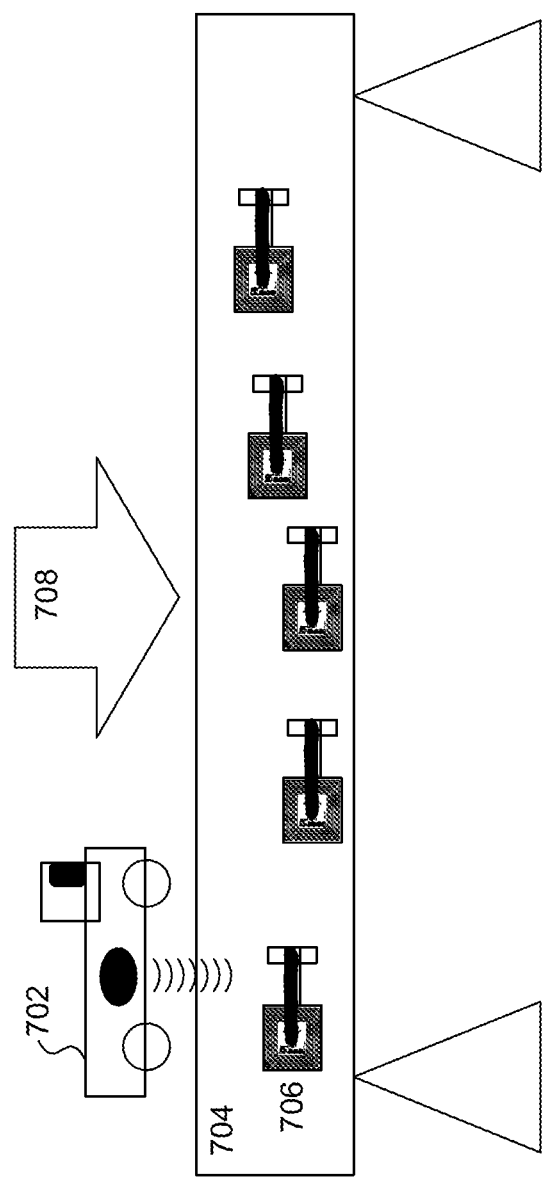
FIG. 7 illustrates a RFID tag with an elongated conductive loop wherein the tag is being used for loading evaluation of a structural component, in accordance with embodiments of the present invention.

FIG. 7 illustrates a RFID tag with an elongated conductive loop wherein the tag is being used for loading evaluation of a structural component, in accordance with embodiments of the present invention. In this example, the RFID tag and elongated conductive loop 706 are configured to monitor the stress experienced by a beam 704, for example a beam of a bridge. The RFID tag and elongated conductive loop can be embedded within the beam, for example if the beam is manufactured from concrete during fabrication of the beam, or may be adhered to the outside surface of the beam. In the example illustrated the loading of the beam by a load 708 at the centre of the beam, will substantially cause maximum tensile stresses at the bottom of the beam and maximum compressive stresses at the top of the beam at the middle of the length of the beam. The loading stresses of the beam will also vary along the length of the beam. By adhering the RFID tag and elongated conductive loop at strategic or plural locations along the depth and length of the beam, the loading conditions of the beam can be monitored and evaluated. For example, a scanning vehicle 702, which includes a reader, can travel over the beam to interrogate the plural RFID tags associated with the beam. For example, if the loading conditions of the beam cause one or more of the elongated conductive loops to break, the RFID tag associated therewith with change from a disabled state to an enabled state and subsequently respond to the reader during interrogation. For example, if the beam illustrated in FIG. 7 is fabricated from reinforced concrete, an elongated conductive loop can be positioned to extend along the length of the beam and positioned at the bottom of the beam, and thereby provide for the monitoring of cracking of the beam due to tensile forces. In this example, the elongated conductive loop can be configured to detect concrete cracks that reach or exceed a predetermined width, as structural integrity of the beam may be compromised for example due to potential environmental exposure of the reinforcement steel embedded within the beam.

According to embodiments, considerations for the selection of the material to fabricate the elongated conductive loop can be based on the ductility of the material, wherein ductility is indicative of the deformability of the material prior to rupture. This selection can be determined based on the desired applications for which the RFID tag and elongated conductive loop are to be monitoring. In some embodiments, the elongated conductive loop is configured to rupture within a predetermined range of elongation and this predetermined range can be determined from the material of the elongated conductive loop and the cross sectional dimensions of the elongated conductive loop. As would be appreciated by a worker skilled in the art, there are a plurality of parameters that can be considered during the design of the elongated conductive loop.

According to embodiments, the elongated conductive loop is positioned on the component to be monitored such that the elongated conductive loop experiences the deformation being monitored, while the RFID tag associated with the elongated conductive loop is at least partially isolated from the deformation being monitored. In some embodiments, the elongated conductive loop is configured to be sensitive to chemical damage.

It would be readily understood, that upon a reader detecting of a change of state of an RFID tag with an elongated conductive loop, for example due to rupture of the elongated conductive loop, the reader can provide an alarm or other signal to an overall monitoring system, which may result in the creation of one or more action items for the evaluation or mitigation of a potential problem that has been detected due to the change of state of the RFID tag with the elongated conductive loop.

Figure 8:
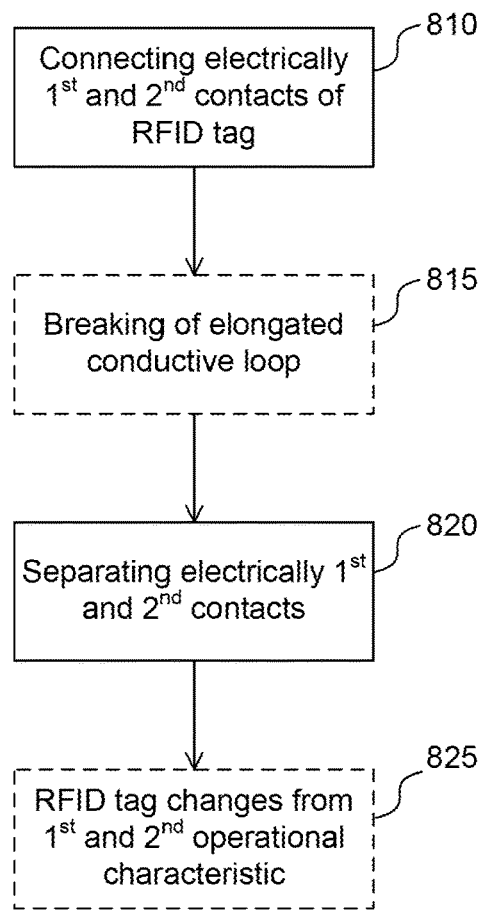
FIG. 8 illustrates a method for changing operation of a RFID tag according to embodiments of the present invention.

According to embodiments, there is provided a method for changing operation of a RFID tag. An example of this method is illustrated in FIG. 8. The method includes electrically connecting 810 a first contact and a second contact of the RFID tag using an elongated conductive loop. This electrical connectivity causing the RFID tag to operate having a first operational characteristic. Upon electrical separation 820 of the first contact and the second contact, the RFID tag changes 825 from having a first operational characteristic to having a second operational characteristic. According to embodiments, the electrical separation of the first contact and the second contact results from the breaking of the elongated conductive loop 815 which may be a result of exposure of the loop to stresses or movement that causes the material forming the elongated conductive loop to rupture, thereby breaking the electrical conductivity of the elongated conductive loop.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A device for detecting a change in state of a physical component, the device comprising:
    a radio frequency identification (RFID) tag having a first contact and a second contact, an antenna and a capacitor; and
    an elongated conductive loop electrically connecting the first contact and the second contact and wherein the RFID tag is responsive in a first frequency to an interrogation signal transmitted by a RFID reader;
    wherein upon breakage of the elongated conductive loop, a part of the antenna is shorted and the RFID tag is responsive in a second frequency to an interrogation signal transmitted by a RFID reader, the first frequency being different from the second frequency.

2. The device according to claim 1, wherein the elongated conductive loop is configured such that breakage of the elongated conductive loop is permanent or irreversible.

3. The device according to claim 1, wherein the elongated conductive loop is connected to the physical component at a first location and a second location, the elongated conductive loop sensitive to an increase in a relative distance between the first location and the second location.

4. The device according to claim 3, wherein breakage of the elongated conductive loop is indicative of an unsafe condition of the physical component.

5. The device according to claim 1, wherein the elongated conductive loop is connected to the physical component from a first location to a second location, the elongated conductive loop sensitive to an increase in stresses applied between the first location and the second location.

6. The device according to claim 5, wherein breakage of the elongated conductive loop is indicative of an unsafe state of the physical component.

7. A method for changing operation of a RFID tag, the method including:
    electrically connecting a first contact and a second contact of the RFID tag using an elongated conductive loop, thereby causing the RFID tag to be responsive in a first frequency to an interrogation signal transmitted by a RFID reader;
    wherein upon electrical separation of the first contact and the second contact, a part of an antenna is shorted and the RFID tag is responsive in a second frequency to an interrogation signal transmitted by a RFID reader, the first frequency being different from the second frequency.

* * * * *